(12) United States Patent
Haid

(10) Patent No.: US 7,889,889 B2
(45) Date of Patent: Feb. 15, 2011

(54) METHOD AND DEVICE FOR REGISTERING A HANDWRITTEN PERSONAL SIGNATURE AND FOR RECOGNIZING THE AUTHENTICITY OF THE SIGNATURE

(75) Inventor: Markus Haid, Stuttgart (DE)

(73) Assignee: SOFTPRO GmbH, Boeblingen (DE)

( * ) Notice: Subject to any disclaimer, the term of this patent is extended or adjusted under 35 U.S.C. 154(b) by 1032 days.

(21) Appl. No.: 11/573,937

(22) PCT Filed: Aug. 19, 2005

(86) PCT No.: PCT/EP2005/008970

§ 371 (c)(1),
(2), (4) Date: Feb. 19, 2007

(87) PCT Pub. No.: WO2006/021372

PCT Pub. Date: Mar. 2, 2006

(65) Prior Publication Data

US 2007/0269083 A1    Nov. 22, 2007

(30) Foreign Application Priority Data

Aug. 21, 2004  (DE) .................. 10 2004 040 607
Nov. 26, 2004  (DE) .................. 10 2004 057 157

(51) Int. Cl.
*G06K 9/00*     (2006.01)
*G01C 21/00*    (2006.01)

(52) U.S. Cl. .................. 382/115; 382/119; 382/122; 701/221

(58) Field of Classification Search ................ 382/115, 382/119, 145, 122, 181, 224, 156, 151, 100; 701/200, 207, 217, 221; 342/64, 188, 175; 257/E21.53, E21.001, E21.521, E21.529; 340/447, 425.5, 438, 442, 445
See application file for complete search history.

(56) References Cited

U.S. PATENT DOCUMENTS 6,393,138 B1 *  5/2002  Chai .......................... 382/119
7,068,821 B2 *  6/2006  Matsutani ................... 382/119

* cited by examiner

*Primary Examiner*—Sheela C Chawan
(74) *Attorney, Agent, or Firm*—David I. Roche; Baker & McKenzie LLP

(57) ABSTRACT

A method and device for registering a handwritten personal signature and for judging its authenticity by comparison with previously registered measured values and data derived therefrom. Signature data is acquired by registering a signature handwritten on a surface by a three-dimensional inertial sensing system having rate-of-rotation sensors and linear acceleration sensors. The data is subjected to a subsequent procedure of recognition or verification or comparison with other signatures. Hence not only tracking is performed with reference to the tip of a writing implement, but the dynamics of the signature are registered and evaluated by numerical calculation and adopted as the basis for the subsequent comparison, effectively ruling out the possibility of fraudulent duplication or tracing-over of a signature by an unauthorized third party. The dynamics i.e. acceleration and deceleration phenomena and rates of rotation as the signature are executed and effectively registered. From them, supplementary measured variables are calculated and specific characteristics are defined from those variables. Those variables are adopted as the basis for comparison, the degree of accuracy of the verification that the signature is genuine can be substantially increased.

20 Claims, 2 Drawing Sheets

METHOD AND DEVICE FOR REGISTERING A HANDWRITTEN PERSONAL SIGNATURE AND FOR RECOGNIZING THE AUTHENTICITY OF THE SIGNATURE

The invention relates to a method for registering a handwritten personal signature in the broadest sense wherein the signature to be registered is handwritten on a surface or substrate, in particular an essentially two-dimensional surface or substrate, while being registered by means of a three-dimensional inertial sensing system. Thus, acceleration and/or rate-of-rotation values measured by sensors as the signature is being handwritten, i.e. inertial sensor signals in the broadest sense, are registered and are either stored in memory as such or are immediately or subsequently forwarded for further data processing in order to derive therefrom in particular digitally storable data which can then be used for comparison with corresponding data from another signature.

One such method is already known from WO-A-98/12661. According to this prior art, a first data stream is registered on the basis of a two-dimensional tracking, and a second data stream is registered on the basis of six degrees of freedom in space (six-dimensional tracking); in addition, contact with the writing substrate is monitored and reflected in a third data stream and, as a fourth data stream, a time-control is adopted as a reference in the data sampling of the first three data streams. What all this amounts to is that two-dimensional tracking on the writing substrate and three-dimensional tracking with orientation monitoring are combined. This is claimed to give greater accuracy.

The fundamental problem of the present invention is that of further increasing certainty of verification of the genuineness of a signature.

This is solved in accordance with the invention by a method with the features of Claim 1.

The gist of the present invention is that the dynamics i.e. the acceleration phenomena and rates of rotation as the signature is being handwritten are registered and are subjected to a subsequent procedure of recognition or verification or comparison with other signatures. Hence the point of the present invention is not, or not only, that tracking is performed, in particular with reference to the tip of a writing implement, but that the dynamics of the signature are registered and in particular evaluated by numerical calculation and adopted as the basis for the subsequent comparison. This can effectively rule out the possibility of fraudulent duplication or tracing-over of a signature by an unauthorized third party. Tracking alone would not enable the real signature to be distinguished from the bogus one. On the other hand, if the true dynamics i.e. acceleration and deceleration phenomena and rates of rotation as the signature is executed are effectively registered, and, from them, supplementary measured variables are calculated and specific characteristics are defined from those variables and adopted as the basis for comparison, the certainty of the verification that the signature is genuine can be substantially increased. This constitutes the nub of the present invention.

In achieving this, it is crucially important that even though the handwritten signature is executed on a surface i.e. a preferably substantially flat two-dimensional substrate, a three-dimensional inertial sensing system is used for registering the signature. This means that the full dynamics of the signature can be registered, in accordance with the invention.

The three-dimensional inertial sensing system comprises rate-of-rotation sensors and linear acceleration sensors. In addition, a pressure sensor can be used in the tip of an input device. The measured data could also be backed up by a magnetic field sensor giving an orientation with respect to the direction of the Earth's magnetic field, or of a magnetic field deliberately superimposed on the device.

In accordance with the invention, the inertial sensor signals, i.e. acceleration and rate-of-rotation values measured by sensors, and data derived therefrom, are directly adopted and stored in memory and used as basic measured variables for comparison. However, further supplementary measured variables may, in particular additionally, be determined therefrom by integration, stored in memory, and used for comparison, such as velocity values and/or positional values and data. Also, signals from rate-of-rotation sensors and data derived therefrom can be directly adopted as basic measured variables, stored in memory, and used for comparison; also, in particular additionally, angles of rotation determined therefrom by integration, as further supplementary measured variables.

If the supplementary measured variables mentioned above are velocities, they are obtained by single integration of measured acceleration values If the supplementary measured variables are distances or positional values, they are obtained by double integration of measured acceleration values. If the supplementary measured variables are angles, they are obtained by single integration of the values measured by the rate-of-rotation sensors.

It has proved advantageous to represent each of the measured variables by a data stream with i elements, i being the product of the duration of the recordal of the signature, i.e. the duration of data acquisition, and the data sampling frequency.

Each measured variable of a signature, in particular in the form of its data stream, could be directly compared with the corresponding measured variable and data stream of another signature to check that the signatures match and have therefore been made by the same person, with the acceleration and deceleration characteristic peculiar to that person. For this check, however, it may also be advantageous to define several characteristics ($b_i$) for each basic measured variable and preferably also for each further calculated variable, and in particular Overall minimum: smallest value recorded over the total duration of the signature;

Position of minimum: position of overall minimum as offset in seconds, measured from the start of the signature;

Overall maximum: largest value recorded over the total duration of the signature;

Position of maximum: position of overall maximum as offset in seconds, measured from the start of the signature;

Number of zero points: number of zero points from the start to the end of the signature;

Distance of zero points: the average interval in seconds between all successive zero points over the total duration of the signature in seconds;

Number of minima: number of local minima from the start to the end of the signature;

Average minimum: average value of all local minima over the total duration of the signature;

Number of maxima: number of local maxima from the start to the end of the signature;

Average maximum: average value of all local maxima over the total duration of the signature;

Average positive slope: average of all slopes with a positive value at the zero points between start and end of the signature;

Average negative slope: average of all slopes with a negative value at the zero points between start and end of the signature;

Length of signature: length of the signature in seconds from start to end.

Thus, in carrying out such a check, the behaviour of the measured value of a variable, or the behaviour of further variables calculated therefrom, over the duration of the recordal of the signature are examined; and from this behaviour one or more characteristics similar to the examples listed above are defined.

In order that the above-mentioned comparison of signatures can be carried out, the characteristics ($b_i$) of an individual measured variable (B) are combined in a vector ($\hat{B}$), and for the comparison of two signatures, vectors of the individual variables are compared with each other by applying a yardstick.

It has proved advantageous to adopt as yardstick a measurement of similarity that is defined as an interval or distance measurement, in particular as a Euclidian distance. To ascertain whether two observed variables of two signatures originate from the same person, their distance is calculated on the basis of the vectors produced $\hat{B}$, $\hat{C}$ with the respective characteristics $b_i$, $c_i$ and of the length n of the vectors (=number of components), adopting Euclidian distance.

$$dist(\hat{B}, \hat{C}) = \sqrt{\sum_{i=1}^{n} (b_i - c_i)^2 / n}$$

In order to be able to calculate the distance of two vectors $\hat{B}$, $\hat{C}$, their dimensions must correspond. The sum of the squares of the intervals is moreover divided by the number of elements n of a vector. This standardization renders distances comparable whose basic vector-pairs have different lengths, i.e. different numbers of components.

It would be quite possible to use this distance measurement of two vectors for comparing signatures. Nevertheless it has proved advantageous to use not a measurement of distance, but a measurement of similarity. Whereas in the case of distance a small value corresponds to a good match between vectors, in the case where a measurement of similarity is adopted a small value corresponds to a poor match. An easy way of converting a distance measurement into a measurement of similarity is to multiply by −1:

$$s(\hat{B}, \hat{C}) = -dist(\hat{B}, \hat{C}).$$

A value of zero denotes a perfect match. The smaller the value, the greater the dissimilarity between the two vectors and hence the measured variables forming the basis for calculation of these vectors.

Some characteristics that arise in the representation of signatures are found to be more telling than others. For instance, the number of zero points or the length of the signature are more meaningful than the average value of all positive slopes. Hence it is in the interest of the quality of the signature-recognition to give greater emphasis to highly expressive characteristics than to less expressive ones when comparing vectors. This can be done by weighting some individual characteristics more heavily than others. With this in mind, the following actions may advantageously be taken:

Scaling a characteristic $b_i$ by multiplying by a constant $C_R$;

Conversion of the characteristic $b_i$ into a percentage of a constant value $p_r$ which corresponds to 100%.

It has moreover proved particularly advantageous to detect the start and end of the handwritten signature as part of the registration. This can prevent movements during the actual recordal time that do not originate from the actual signature from being picked up in the comparison, particularly in the calculation of characteristics, and from falsifying the results.

It has proved particularly advantageous to establish the start and end of the signature by reference to the slope of the sensor-measured values at the zero points, identifying the zero point whose slope exceeds a pre-defined value as the start of the signature. Thus a signature starts at the zero point whose slope is the first to exceed a pre-defined value, as can be determined by a threshold value check. A signature ends at the zero point whose slope is the last to exceed the same pre-defined value.

The invention also relates to a device for carrying out the method according to the invention and specifically both a device for registering an original "genuine" handwritten personal signature and further signatures needing to be checked, and a device for carrying out this check. The device according to the invention includes an input device which can be guided by hand and which can in particular be constructed in the form of a pen or writing implement. This input device then contains the three-dimensional inertial sensing system. It may additionally include evaluation means for processing values measured by the inertial sensing system, and a memory device. However, it would also be feasible for the device, and in particular the input device, to comprise an interface for communicating data to an external computing device and/or a memory device and/or a display device.

The device also comprises means for comparing measured values or data from different handwritten signatures. If—as described previously—characteristics are defined and determined from measured values or data on specific measured variables, and the comparison is to be made on the basis of these derived characteristics, then the claimed device also comprises means for calculating such characteristics of the respective measured variables.

The invention moreover relates to the use of a three-dimensional inertial sensing system for the registration and/or recognition of a personal signature in the broadest sense handwritten on an essentially two-dimensional surface, by registering the dynamics (acceleration, rate of rotation) of the handwritten personal signature and taking these dynamics into account in the recognition or comparison with other signatures.

Further features, particulars and advantages of the invention will follow from the accompanying claims and from the graphic illustration of one preferred embodiment of the invention. In the drawing:

The method according to the invention caters for signature recognition without a frame of reference. Hence the signature to be checked does not have to be produced on a "tablet" or "pad" or special printed barcode-type form, but can in principle be made on any desired surface. The method can be used for registering a signature normally consisting of two or three words. According to experience, the signing process lasts from 1 up to a maximum of 10 seconds. On this timescale, the drift of inertial sensors is relatively insignificant. This being so, it is possible to conduct a biometrically reliable signature-recognition whilst retaining the advantage of referenceless data-acquisition. The signature can be produced on any desired writing surface.

Figure 1:
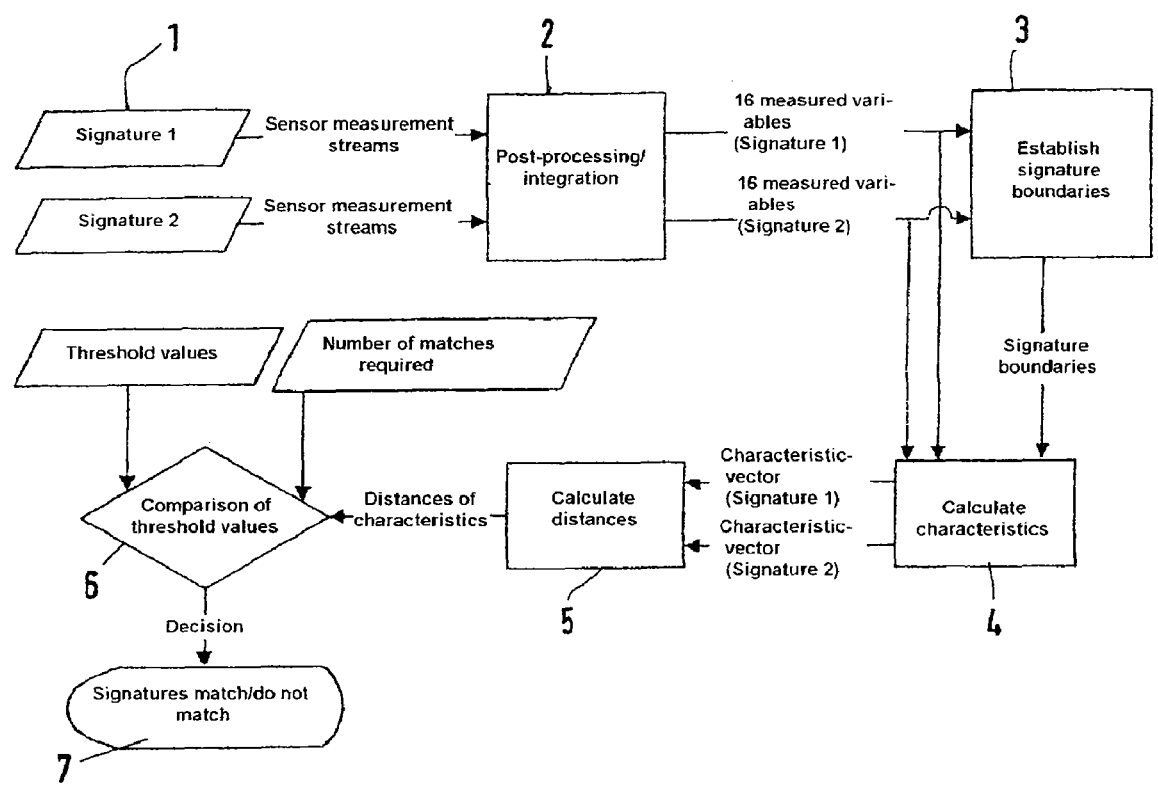
FIG. 1 is a flow chart explaining the steps in the registration and comparison of signatures.

FIG. 1 shows the sequence of the method steps to be performed in accordance with one embodiment of the invention. Two signatures that are to be compared with each other are made by hand on a writing surface, and are registered. This process of registration is here represented as if it were a parallel operation for signatures 1 and 2. In practice these operations are separated in both time and space. Specifically, an authorized person will first of all furnish a handwritten signature to serve as a permanent record; on that occasion, the signature will be registered in the manner described below, and filed in any chosen manner and at any chosen location as a biometric datum, identifying mark or individualizing characteristic. The purpose of the signature recognition is to make it possible to check the genuineness of a signature that is provided at a later time and at some other location; that is to say, to ascertain whether it originates from the same authorized person or has been duplicated by an unauthorized person for fraudulent purposes.

Figure 2:
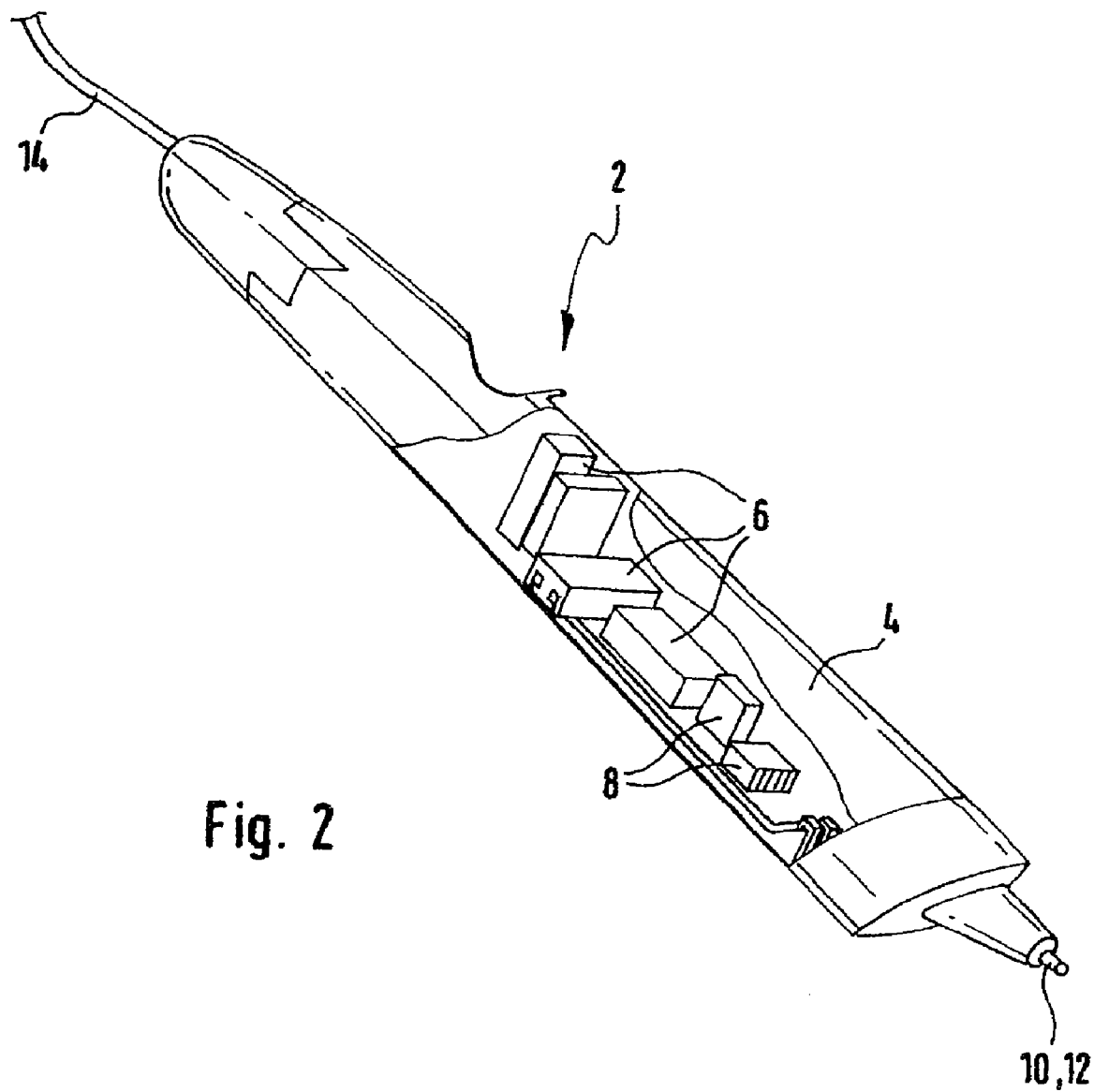
FIG. 2 shows a device in the form of a writing implement.

In any case the signatures 1 and 2 to be compared with each other are handwritten on a writing surface in a Method Step 1 (see FIG. 1) while being registered by means of a three-dimensional inertial sensor system. The device 2 according to the invention which is used for this purpose is constructed in the form of a writing implement 4, in particular a pen, which carries the three-dimensional inertial sensor system, and is shown schematically in FIG. 2. Preferably, three acceleration sensors 6 orientated in the three directions in space at a predetermined angle of preferably 90° to each other, and three rate-of-rotation sensors 8, are used. In the present example, a force sensor 10 at the pen tip 12 of the input device 2 is also used. Thus a total of seven sensors are provided (six inertial sensors and one force or pressure sensor) to record measured values during the execution of the signature, at a predetermined sampling frequency of approx. 0.3 kHz to 3 kHz, these recorded values then being stored in the form of a data stream in a memory device. For this purpose, the writing implement 4 shown by way of example has a data line 4 serving as a link for passing measured values and data to a computer. The data line can be used bidirectionally.

The measured acceleration data and values measured by rate-of-rotation sensors form six so-called basic measured variables. In Step 2, a further nine variables are additionally derived by calculation from these measured values, viz. three velocity values, by single integration of the three measured acceleration values, three positional values, by double integration of the measured acceleration values, and three rotational angles, by single integration of the values measured by the rate-of-rotation sensors. A further measured variable is furnished by the force or pressure sensor. This gives a total of sixteen measured variables to be used for the comparison of the signatures.

With the aid of these measured variables—sixteen in the case illustrated by way of example (seven basic measured variables plus nine supplementary measured variables derived therefrom)—, the boundaries of the signature, i.e. the start and end of the handwritten personal signature, are determined in Step 3. This will prevent movements during the overall data-recording time that do not originate from the signature from being picked up in the evaluation and from falsifying the results. The start and end of a handwritten signature are determined from the slope at the zero points. A signature starts at the zero point whose slope is the first to exceed a pre-defined value. A signature ends at the zero point whose slope is the last to exceed the same pre-defined value.

Next, in Step 4, characteristics are defined, and/or pre-defined characteristics determined, preferably for each of the sixteen measured variables, using the respective data streams of the measured variables. As the outcome of this determination, a characteristic vector $\hat{B}$ is obtained—preferably for each measured variable—whose components comprise the respective characteristics $b_i$. In accordance with a preferred embodiment of the method according to the invention, the following characteristics are defined and calculated preferably for each measured variable and filed as a characteristic vector which is then available for further processing, and is preferably stored in memory:

Overall minimum: smallest value recorded over the total duration of the signature;

Position of minimum: position of overall minimum as offset in seconds, measured from the start of the signature;

Overall maximum: largest value recorded over the total duration of the signature;

Position of maximum: position of overall maximum as offset in seconds, measured from the start of the signature;

Number of zero points: number of zero points from the start to the end of the signature;

Distance of zero points: the average interval in seconds between all successive zero points over the total duration of the signature in seconds;

Number of minima: number of local minima from the start to the end of the signature;

Average minimum: average value of all local minima over the total duration of the signature;

Number of maxima: number of local maxima from the start to the end of the signature;

Average maximum: average value of all local maxima over the total duration of the signature;

Average positive slope: average of all slopes with a positive value at the zero points between start and end of the signature;

Average negative slope: average of all slopes with a negative value at the zero points between start and end of the signature;

Length of signature: length of the signature in seconds from start to end.

Calculation of the individual characteristics $b_i$ and characteristic vectors $\hat{B}$ is based solely on the measured values or data of the basic measured variables and supplementary measured variables that have been determined between the start and end of the handwritten signature, i.e. not on all measured values and data over the entire recordal period.

In a further Method Step 5, the characteristic vectors are compared with the aid of a yardstick which in the case illustrated by way of example is a measure of similarity. In Step 5 this is done by first of all calculating a distance in the form of the Euclidian distance of two characteristic vectors $\hat{B}$ and $\hat{C}$ that refer to the same measured variable but belong to different signatures 1 and 2. The sum of the squares of the distances is obtained and divided by the number of elements n of the vectors. This standardization makes it possible to compare distances whose basic vector-pairs have different lengths.

However, it has proved advantageous to adopt for a comparison, in particular for a threshold value comparison, not the distance of two characteristic vectors but a measure of similarity s(B,C) obtained therefrom.

$$s(\hat{B}, \hat{C}) = -dist(\hat{B}, \hat{C})$$

$$dist(\hat{B}, \hat{C}) = \sqrt{\sum_{i=1}^{n} (b_i - c_i)^2 / n}$$

A perfect match is represented by a value of zero for $s(\hat{B},\hat{C})$. The smaller the value of $s(\hat{B},\hat{C})$, the greater the dissimilarity between the two biometric characteristics.

Some characteristics that arise in the recognition or comparison of handwritten signatures have been found to be more telling than others. Such characteristics are therefore advantageously weighted more heavily, namely by scaling the particular characteristic $b_i$ by multiplying by a constant $C_R$, or by converting the characteristic $b_i$ into a percentage of a constant value $p_r$ which corresponds to 100%.

The result in Step 5 is in this instance a modified measure of the distance of the characteristic vectors; characteristic vectors having preferably been determined for all measured variables and the modified distance having been determined for each vector-pair. From the distances, Step 6 establishes in how many measured variables the signatures 1 and 2 correspond, by subjecting each distance of vector-pairs to a threshold value comparison. The number of matches of the measured variables is then determined and compared with a required number of matches that can be preset. Depending on the outcome of this comparison, a decision is made that the signatures do or do not match. This is displayed, in particular visually, in Step 7. Depending on this outcome, authorization can then be given or refused, in whatever way may be appropriate.

The invention claimed is:

1. Method for registering a handwritten personal signature and for judging its authenticity by comparison with previously registered measured values and data derived therefrom and stored in memory by registering a signature handwritten on a surface by a three-dimensional inertial sensing system having at least one rate-of-rotation sensor and at least one linear acceleration sensor extended along directions in space, and by storing in memory and/or forwarding for further data processing measured acceleration values and values measured by the rate-of-rotation sensor thereby determined or data derived therefrom, the measured data stored in memory and/or processed forming the basis for comparison with other handwritten signatures which have also been registered for this purpose, the method comprising: calculating supplementary measured variables from values measured by the sensing system, the values including measured acceleration values and values measured by the rate-of-rotation sensors, which measured variables form the basis for the comparison with other handwritten signatures, and defining a plurality of characteristics for each measured variable and combining the characteristics of each measured variable as a vector for the comparison of two signatures, comparing the vectors of the respective measured variables with each other to determine their similarity.

2. A method according to claim 1 where in the at least one rate-of-rotation sensor comprises three sensors, and the at least one linear acceleration sensor comprises three sensors.

3. A method according to claim 1, wherein the inertial sensing system additionally comprises at least one magnetic field sensor.

4. A method according to claim 1, wherein a pressure sensor is additionally used.

5. A method according to claim 1, wherein the supplementary measured variables are velocities obtained by single integration of the measured acceleration values.

6. A method according to claim 1, characterized in that the supplementary measured variables are traversed distances obtained by double integration of the measured acceleration values.

7. A method according to claim 1, characterized in that the supplementary measured variables are angles obtained by single integration of the values measured by the rate-of-rotation sensors.

8. A method according to claim 1, characterized in that each of the measured variables is represented by a data stream with i elements, i being the product of the duration of data acquisition and the data sampling frequency.

9. A method according to claim 1, characterized in that the following in particular are defined as characteristics:
Overall minimum: smallest value recorded over the total duration of the signature;
Position of minimum: position of overall minimum as offset in seconds, measured from the start of the signature;
Overall maximum: largest value recorded over the total duration of the signature;
Position of maximum: position of overall maximum as offset in seconds, measured from the start of the signature;
Number of zero points: number of zero points from the start to the end of the signature;
Distance of zero points: the average interval in seconds between all successive zero points over the total duration of the signature in seconds;
Number of minima: number of local minima from the start to the end of the signature;
Average minimum: average value of all local minima over the total duration of the signature;
Number of maxima: number of local maxima from the start to the end of the signature;
Average maximum: average value of all local maxima over the total duration of the signature;
Average positive slope: average of all slopes with a positive value at the zero points between start and end of the signature;
Average negative slope: average of all slopes with a negative value at the zero points between start and end of the signature;
Length of signature: length of the signature in seconds from start to end.

10. A method according to claim 1, wherein the similarity is determined based on a comparison of Euclidian distance.

11. A method according to claim 1, wherein the similarity is determined by a multiplication of the Euclidian measure.

12. A method according to claim 1, wherein characteristics of a vector are weighted differently for the execution of the comparison.

13. A method according to claim 1, wherein the start and end of the handwritten signature are determined.

14. A method according to claim 13, wherein the start and end are established by reference to the slope at the zero points, by identifying the zero point whose slope exceeds a predefined value as the start of the signature.

15. A method according to claim 13, characterized in that only the sensor data between the start and end of the handwritten signature are adopted for the calculation of the individual characteristics.

16. A device for carrying out the method according to claim 1, comprising an input device, the input device comprising a three-dimensional inertial sensing system comprising at least one rate-of-rotation sensor and at least one linear acceleration sensor that can be manually guided on a surface to execute the signature, the device comprising an evaluation device adapted to process measured values from the inertial sensing system into data storable in memory and subjected to further processing, a comparing device adapted to compare the measured values or data from different handwritten signatures and a calculating device adapted to calculate characteristics of respective measured variables.

17. A device according to claim 16, wherein the device, and in particular the input device, is constructed in the form of a pen.

18. A device according to claim 17, wherein the device, and in particular the input device, is constructed as a writing implement.

19. A device according to claim 16, wherein the device, and in particular the input device, comprises an interface for communicating data to an external computing device and/or memory device and/or display device.

20. A method for judging the authenticity of a signature by comparison with previously registered measured values and data stored in memory comprising: registering a signature handwritten on a generally two-dimensional surface by using a three-dimensional inertial sensing system having at least one rate-of-rotation sensor and at least one linear acceleration sensor, storing in memory for further data processing measured acceleration values and values measured by the rate-of-rotation sensor, the measured data stored in memory forming the basis for comparison with other handwritten signatures which have also been registered for this purpose, supplementary measured variables being calculated from values measured by measured acceleration values and values measured by the rate-of-rotation sensors forming the basis for the comparison with other handwritten signatures, characteristics being defined for each measured variable and the characteristics of each measured variable being combined as a vector, comparing two vectors of the respective measured variables with each other to determine their similarity.

* * * * *